US012306311B2

(12) United States Patent
Kumar et al.

(10) Patent No.: US 12,306,311 B2
(45) Date of Patent: May 20, 2025

(54) AUTOMATIC DETECTION OF MOTION PROFILES

(71) Applicant: Kymeta Corporation, Redmond, WA (US)

(72) Inventors: Piyush Kumar, Redmond, WA (US); Bruce Rothaar, Woodinville, WA (US); Michael Kreeger, Redmond, WA (US); Andreas Wanka, Redmond, WA (US)

(73) Assignee: KYMETA CORPORATION, Redmond, WA (US)

( * ) Notice: Subject to any disclaimer, the term of this patent is extended or adjusted under 35 U.S.C. 154(b) by 90 days.

(21) Appl. No.: 17/707,046

(22) Filed: Mar. 29, 2022

(65) Prior Publication Data
US 2022/0317308 A1 Oct. 6, 2022

Related U.S. Application Data

(60) Provisional application No. 63/168,949, filed on Mar. 31, 2021.

(51) Int. Cl.
*G01S 19/02* (2010.01)
*H01Q 1/28* (2006.01)

(52) U.S. Cl.
CPC ............. *G01S 19/02* (2013.01); *H01Q 1/288* (2013.01)

(58) Field of Classification Search
CPC ..... G01S 19/02; H01Q 1/288; H01Q 3/00–46
See application file for complete search history.

(56) References Cited

U.S. PATENT DOCUMENTS

| | | | |
|---|---|---|---|
| 10,886,996 B1 | 1/2021 | Robu | |
| 11,742,933 B1* | 8/2023 | Sherman | H04B 7/18519 455/12.1 |
| 2008/0258971 A1 | 10/2008 | Nichols et al. | |
| 2009/0326740 A1* | 12/2009 | Wang | G01C 23/00 701/3 |
| 2010/0259609 A1* | 10/2010 | Takahashi | G06V 10/768 348/148 |
| 2013/0040682 A1 | 2/2013 | Chang et al. | |
| 2014/0105086 A1* | 4/2014 | Chhabra | H04W 48/16 370/311 |
| 2015/0011159 A1 | 1/2015 | Marinov et al. | |
| 2019/0372233 A1 | 12/2019 | Stokes et al. | |
| 2021/0028841 A1* | 1/2021 | Logothetis | H04W 16/28 |
| 2021/0207961 A1* | 7/2021 | Saini | G01S 19/49 |

(Continued)

OTHER PUBLICATIONS

International Search Report and Written Opinion on the Patentability of Application No. PCT/US2022/022599 Mailed Jul. 22, 2022, 11 pages.

(Continued)

*Primary Examiner* — Bernarr E Gregory
*Assistant Examiner* — Hailey R Le
(74) *Attorney, Agent, or Firm* — Womble Bond Dickinson (US) LLP

(57) ABSTRACT

Methods and apparatuses for controlling a satellite antenna based on its motion are disclosed. In some embodiments, the method comprises determining a motion state of an antenna for communication with a satellite, determining a motion profile for the antenna based on the motion state, and controlling the antenna based on the motion profile.

19 Claims, 13 Drawing Sheets

(56) References Cited

U.S. PATENT DOCUMENTS

| | | | |
|---|---|---|---|
| 2021/0248523 A1* | 8/2021 | Wick | G06N 20/00 |
| 2023/0325011 A1* | 10/2023 | Kim | G06F 3/03543 |
| | | | 345/158 |
| 2023/0352815 A1* | 11/2023 | Dadgarpour | H01Q 5/42 |

OTHER PUBLICATIONS

International Preliminary Report on Patentability received for PCT Patent Application No. PCT/US2022/022599, mailed on Oct. 12, 2023, 7 pages.

* cited by examiner

```
┌─────────────────────────────────────────────────────────────────────────────┐
│ Obtain first and second readings from the gyroscope and the accelerometer, respectively, and a GPS │
│                      report of a speed from the GPS sensor                  │
│                                     501                                     │
└─────────────────────────────────────────────────────────────────────────────┘
                                       ▼
┌─────────────────────────────────────────────────────────────────────────────┐
│ Set the second value to a norm of x, y and z accelerometer components of the second reading and │
│ calculating a rolling average of a predetermined period of time of a standard deviation of the second │
│                                    reading                                  │
│                                     502                                     │
└─────────────────────────────────────────────────────────────────────────────┘
                                       ▼
┌─────────────────────────────────────────────────────────────────────────────┐
│ Set the third value to the speed for a current frame or a last-reported GPS speed if no GPS report exists for │
│                               the current frame                             │
│                                     503                                     │
└─────────────────────────────────────────────────────────────────────────────┘
```

FIG. 5A

Set the first value to a maximum value from a set of absolute values of gyroscope components of the first reading
511

Set the second value to a norm of x, y and z accelerometer components of the second reading and calculating a rolling average of a predetermined period of time of a standard deviation of the second reading
512

Set the third value to the speed for a current frame or a last-reported GPS speed if no GPS report exists for the current frame
513

FIG. 5B

AUTOMATIC DETECTION OF MOTION PROFILES

RELATED APPLICATION

The present application is a non-provisional application of and claims the benefit of U.S. Provisional Patent Application No. 63/168,949, filed Mar. 31, 2021, and entitled "Automatic Detection of Motion Profiles," which is incorporated by reference in its entirety.

FIELD OF THE INVENTION

Embodiments of the invention are related to wireless communication; more particularly, embodiments of the invention are related to controlling operations of an antenna (e.g., an electronically scanned antenna) based on its motion profile.

BACKGROUND

Wireless technologies, such as those for satellite communication, continue to grow in number, variety and capability. The continually-changing nature of these technologies poses challenges for some use cases. For example, there is an increasing demand for the automotive industry to provide in-vehicle solutions to support, replace or supplement the use of consumer smartphones and on-board cellular technology modules.

Flat-panel antennas have become more prevalent in satellite communication systems in recent years. Of these flat-panel antennas, electronically-scanned antennas such as metasurface antennas have emerged as a new technology for generating steered, directive beams from a lightweight, low-cost, and planar physical platform. Metasurface antennas may comprise metamaterial antenna elements that can selectively couple energy from a feed wave to produce beams that may be controlled for use in communication. These antennas are capable of achieving comparable performance to phased array antennas from an inexpensive and easy-to-manufacture hardware platform, and are also being used in in-vehicle solutions.

While the automotive industry is one example of a market that can benefit from satellite communication solutions that are flexible in design and resource efficient, the use of such flat-panel antenna on moving vehicles is made more difficult because many such antennas rely on determining the orientation of the antenna to function well. With the possible changes in terrain encountered while a vehicle moves, obtaining accurate antenna orientation can be made more difficult. The same problem exists for integrations of these antennas on maritime vessels.

SUMMARY

Methods and apparatuses for controlling a satellite antenna based on its motion are disclosed. In some embodiments, the method comprises determining a motion state of an antenna for communication with a satellite, determining a motion profile for the antenna based on the motion state, and controlling the antenna based on the motion profile.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5A is a flow diagram of one embodiment of a process for determining whether the antenna is stationary or moving.

FIG. 5B is a flow diagram of one embodiment of a process for deriving values from sensor data received from sensor data.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Techniques are disclosed herein for controlling an antenna based on a motion state of an antenna. In some embodiments, the antenna is an electronically scanned antenna. The antenna can be part of a leaky-wave antenna and has sub-wavelength radiating slots. In some embodiments, the antenna comprises a metasurface having metamaterial antenna elements that radiate radio-frequency (RF) energy. Such antenna elements can be surface scattering antenna elements. Examples of such antenna elements includes liquid crystal (LC)-tuned RF radiating antenna elements, varactor-based antenna elements in which one or more varactor diode is used for tuning the radiating slot antenna element, etc. In one embodiment, the antenna is part of a satellite terminal.

In some embodiments, the techniques described herein include a process for detecting motion behavior of an antenna in order to be able to optimize performance for a particular scenario. In some embodiments, the method has two parts: 1) identification of a particular motion pattern or scenario; and 2) modifying behavior of the antenna to improve, and potentially optimize, performance in that particular motion pattern or scenario. In some embodiments, the antenna makes a determination, based on one or more sensors, that it is stationary or it is moving. The sensors can be part of or otherwise coupled the antenna itself. After making the determination, the antenna applies a set of parameters that are designed or selected for that scenario.

Figure 1:
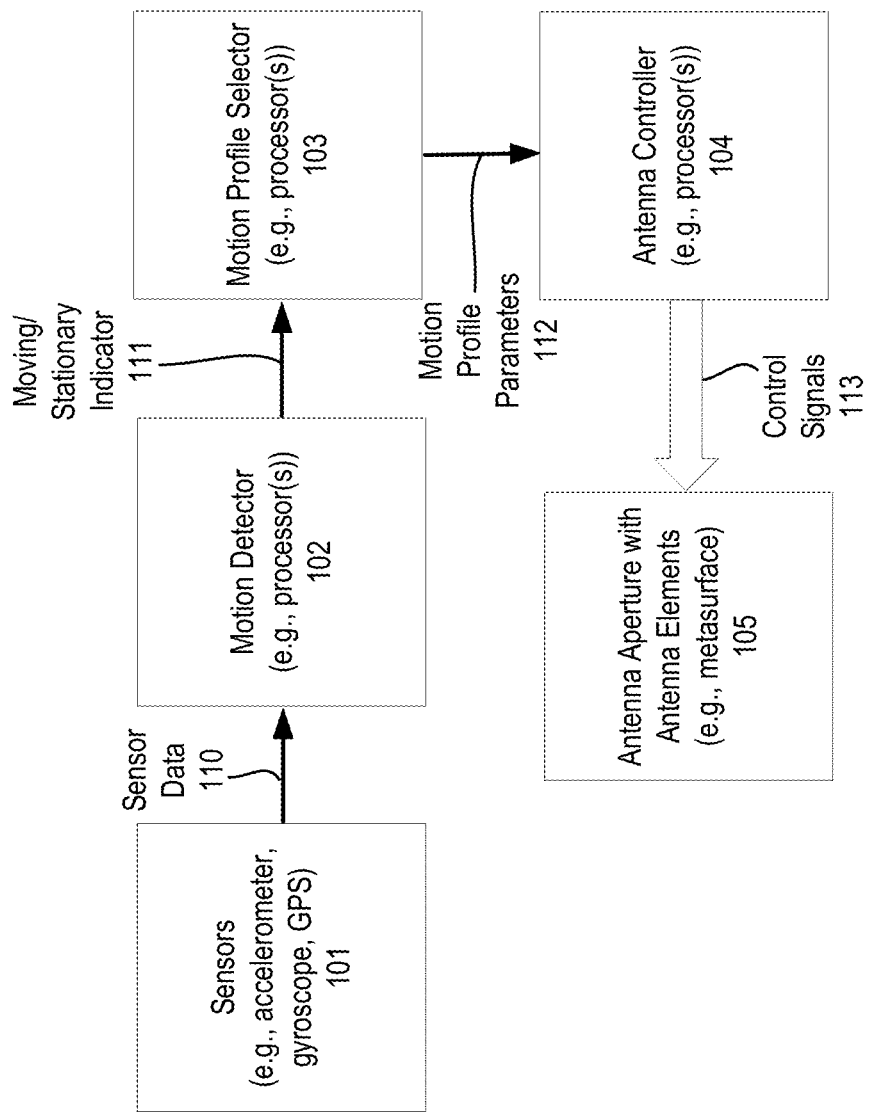
FIG. 1 illustrates a data flow diagram of some embodiments of a process for controlling antenna.

FIG. 1 illustrates a data flow diagram of some embodiments of a process for controlling antenna. The process is performed by processing logic that comprises hardware (e.g., circuitry, dedicated logic, etc.), software (e.g., software running on a chip(s) or processor(s), etc.), firmware, or a combination of the three. In one embodiment, the processing logic is part of an antenna for satellite communication such as, for example, an antenna that is part of a satellite terminal.

Referring to FIG. 1, sensors 101 generate sensor data 110. In one embodiment, sensors 101 include one or more of an accelerometer, gyroscope, GPS sensor, etc. There can be more than one of each of the sensor types. In some embodiments, one or more sensors of sensors 101 are part of an inertial measurement unit (IMU) that are coupled to a printed circuit board (PCB) of a device containing the antenna (e.g., satellite terminal).

In response to sensor data 110, motion detector 102 generates an indication of whether the antenna is moving or stationary. This indication is referred to herein as moving/stationary indicator 111. In some embodiments, motion detector 102 generates moving/stationary indicator 111 using one or more processors.

Motion profile selector 103 receives moving/stationary indicator 111 and, in response thereto, generates motion profile parameters 112 for controlling the antenna based on whether the antenna is moving or stationary as indicated by moving/stationary indicator 111. Parameters 112 may be stored in memory that is accessed according to the state of moving/stationary indicator 111. In some embodiments, motion detector 102 and motion profile selector 103 are implemented with one or more processors of a device containing the antenna (e.g., satellite terminal) and coupled to the IMU containing sensors 101 via a PCB.

Antenna controller 104 obtains the motion profile parameters 112 and generates control signals 113 based on the parameters 112 to control antenna aperture 105. In some embodiments, antenna aperture 105 comprises a metasurface antenna with other material antenna elements (e.g., varactor-tuned antenna elements, LC-tuned antenna elements, etc.); however, the techniques disclosed herein may be applied to other antennas and are not limited to metasurface antennas.

Figure 2:
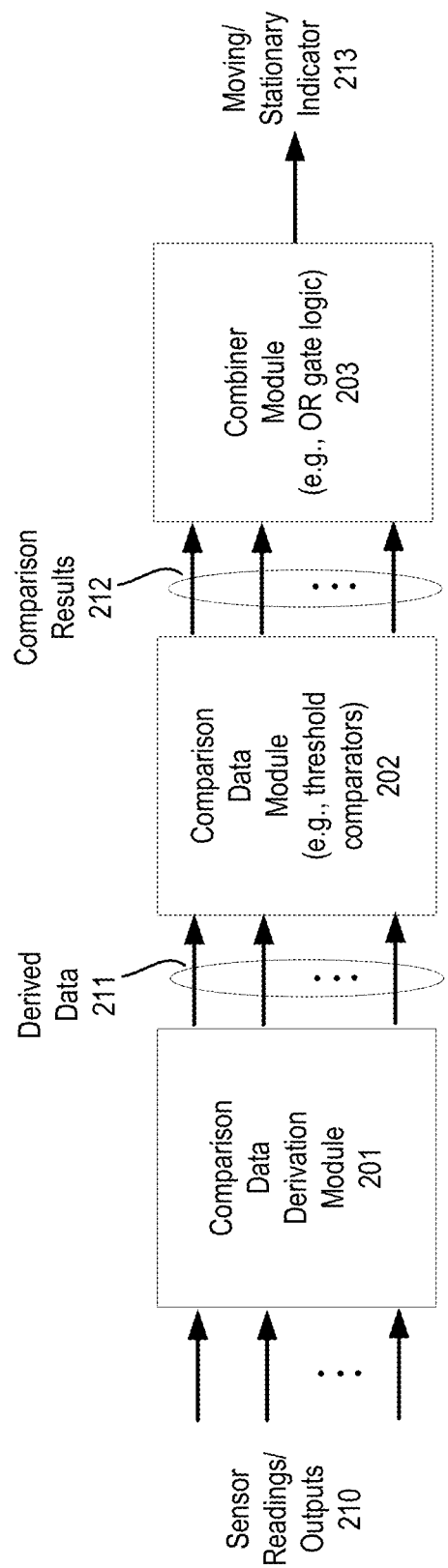
FIG. 2 is a data flow diagram of some embodiments of a motion detection process.

FIG. 2 is a data flow diagram of some embodiments of a motion detection process. The process is performed by processing logic that comprises hardware (e.g., circuitry, dedicated logic, etc.), software (e.g., software running on a chip(s) or processor(s), etc.), firmware, or a combination of the three. In some embodiments, the motion detector process is performed by motion detector 102 of FIG. 1.

Referring to FIG. 2, the process begins by comparison data derivation module 201 receiving sensor readings/outputs 210. Sensor readings/outputs 210 are generated by sensors such as, for example, one or more accelerometers, or more gyroscopes, one or more GPS sensors. In response to sensor readings/output 210, comparison data derivation module 201 generates derived data 211 that may be used for comparisons with one or more thresholds. Examples of derived data is described in further information below. In some embodiments, one or more sensors readings/outputs 210 are the same as the data received at inputs by comparison data derivation module 201. In other words, some of the sensor data received as sensor readings/output 210 does not undergo any operations and is passed through and output from comparison data derivation module 201 unchanged.

Data comparison module 202 receives derived data 211 and performs comparisons on the data. In some embodiment, data comparison module 202 performs an individual comparison against each data element received as part of derived data 211. For example, data comparison module 202 can compare each data element to derived data 211 against a threshold using a threshold comparator. The results of the comparisons performed by data comparison module 202 are output as comparison results 212.

Combiner module 203 receives comparison results 212 and combines the outputs to produce a moving/stationary indicator 213 (e.g., moving/stationary indicator 111 of FIG. 1). In some embodiments, combiner module 203 performs a logical ORing function that indicates that the antenna is moving if one or more of the comparison role results 212 indicate that derived data is greater than its corresponding comparison threshold.

Based on the determination of whether the antenna is moving or stationary, a satellite terminal can control its antenna in a certain manner. For example, in some embodiments, the satellite terminal is operable to determine the orientation of the antenna in different ways depending on whether its antenna is determined to be moving or not and, in turn, apply a set of parameters that improve, and potentially optimize, cross polarization performance for when the antenna is stationary. In other words, the satellite terminal performs motion detection and then applies a set of parameters to improve cross polarization performance. This has shown to improve performance of some antennas by several dB. More specifically, in some embodiments, if the motion detection process determines that the antenna is stationary, then different sensors can be used to obtain an improved orientation estimate that can then be used to calculate a commanded polarization angle for the antenna. For instance, when the antenna is determined to be stationary, the satellite terminal uses readings from the accelerometers to indicate the tilt of vehicle (to determine how to direct the beam to the satellite); once the antenna is determined to be moving, the satellite user terminal does not use the readings from accelerators to indicate the tilt of vehicle. In the case where the antenna is moving, the satellite terminal uses sensor data from other sensors to determine the commanded polarization angle for the antenna because the accelerometers are no longer accurate. For example, in some embodiments, when the antenna is moving (e.g., a vehicle to which the antenna is attached is moving), an estimate of the tilt which can be derived from a closed-loop dither tracking algorithm. In this case, the sensor is the tracking receiver that is locked to the carrier. In some other embodiments, when the antenna is moving, data from other possible sensors may be used, such as, for example, a camera. Once the antenna (and its vehicle) stops moving, the satellite user terminal can transition back to using the accelerometers to provide tilt to generate the commanded polarization angle for the antenna.

Additional controls can be applied to the antenna based on whether the antenna is determined to be moving or stationary. For example, in some embodiments, the satellite terminal can apply a set of parameters that would improve antenna pointing. For example, if the antenna is determined to be moving or not, different search patterns can be used for signal acquisition, such as if moving, the search space may be increased when performing signal acquisition). This expansion of the search space is particularly useful with maritime vessels where motion includes when the direction of travel does not align to the heading.

Other controls that can be applied to the antenna based on whether it is determined to be moving or stationary include performing self-calibration or not based on whether its antenna is determined to be moving or not. Also, in some embodiments, determining whether its antenna is moving or not controls whether to perform IMU calibration (if stationary) to estimate the terminal's gyroscope bias and/or measure gravity vector of the terminal's accelerometer, which are performed when the antenna is stationary.

Thus, embodiments described herein identify the motion state (e.g., moving or stationary) for a terminal and its antenna and then apply parameters to the terminal that are selected based on their motion state.

An Exemplary Algorithm

In some embodiments, the satellite terminal determines whether the antenna is in motion and based on that operates in Communications-On-The-Pause (COTP) mode. In some embodiments, the terminal generates a binary value that indicates whether the antenna is stopped, which allows the terminal to operate in COTP mode until motion resumes. When in COTP mode, the pointing & tracking (P&T) algorithm can behave differently than when in motion. In some embodiments, when the antenna is not moving and in COTP mode, the orientation is estimated using data from certain sensors while the orientation is estimated from different data if moving.

As discussed above, in some embodiments, gyroscopes and accelerometers are used in the process of determining the motion state of the antenna. Gyroscopes sense angular motion and report rate of rotation (dps). A detector can be made with a simple threshold function as described above to compare the values from the sensors to make a determination as to whether the antenna is in motion or not. In theory, the gyroscopes cannot sense if a car is traveling forward, or starting or stopping, though a vehicle leaving from a stopped position (e.g., at a stop light) is likely to trip such a detector since any vehicle with a suspension system will tilt backwards upon forward acceleration, causing a non-zero angular rate output on the pitch axis.

Similarly, accelerometers sense acceleration, and acceleration is ever present due to gravity, and would be present on other axes as an antenna tilts. Accelerometers will also sense linear acceleration, though not constant velocity. Linear acceleration could be reported as a pitch or roll as the vehicle moves away from a stopped position (e.g., at a stop light), even if the vehicle remains flat. This causes a problem with trying to use the sensors to calculate an orientation. For example, reporting a roll or pitch even when the car is flat could push the beam off the satellite. If linear acceleration is detected, then the satellite terminal can force itself into normal mode during that time. In some embodiments, the satellite terminal is designed with a preference to enter COTP mode when sensing determines that the car has stopped, and to stay in that mode until sensing determines that the car is again in motion.

In some embodiments, the embodiments described herein operate whether the vehicle is parked on a hill or not. When on a hill, the roll or pitch will have a non-zero value. Therefore, the satellite terminal cannot simply apply a threshold to roll and pitch values to sense motion. The terminal needs to sense that there has been a change in roll or pitch. Then the terminal won't trigger when the vehicle is already parked on the hill, but will trigger when the vehicle starts moving. But if the vehicle continues at a constant speed along a smooth road, the trigger will not occur and the algorithm will switch to COTP mode.

To overcome these issues, a GPS sensor is used. If the GPS is reporting a non-zero velocity, then the satellite terminal prevents entry into COTP mode. However, because the GPS alone may not be fast enough to catch a sudden acceleration from a stopped position (e.g., stopped at a stop light), the accelerometer is still used.

Note that COTP is only one mode that is invoked for a particular motion profile. In alternative embodiments, there are other or additional motion profiles and the satellite terminal could determine a motion profile associated with current motion of the antenna and then apply a set of parameters to control the antenna (e.g., have the antenna enter a particular mode for when the terminal is in that motion profile, perform in a particular way when in that motion pattern, etc.).

Figure 3A:
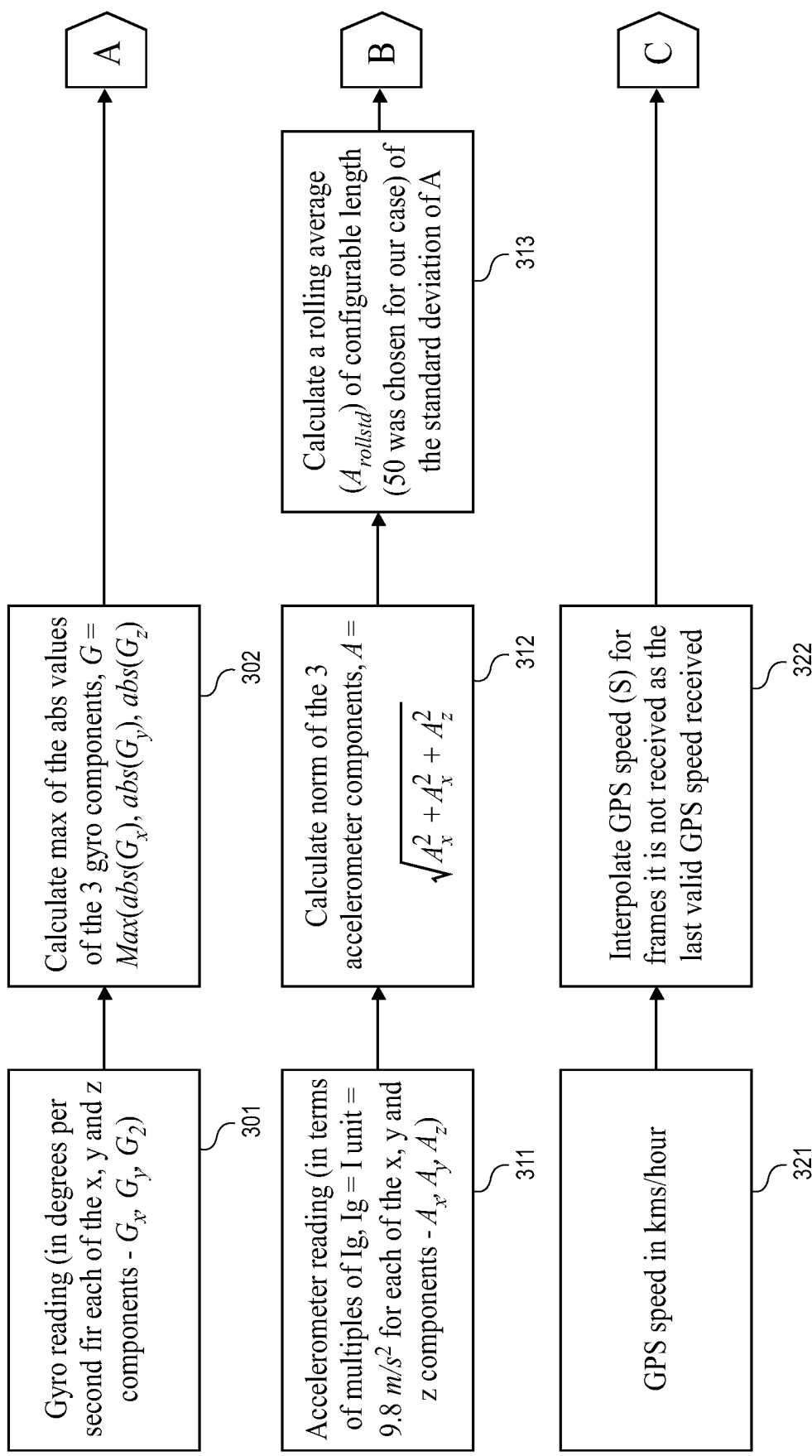
FIGS. 3A and 3B illustrates some embodiments of an auto detection algorithm to determine whether the antenna is in motion (e.g., moving or stationary)
Figure 3B:
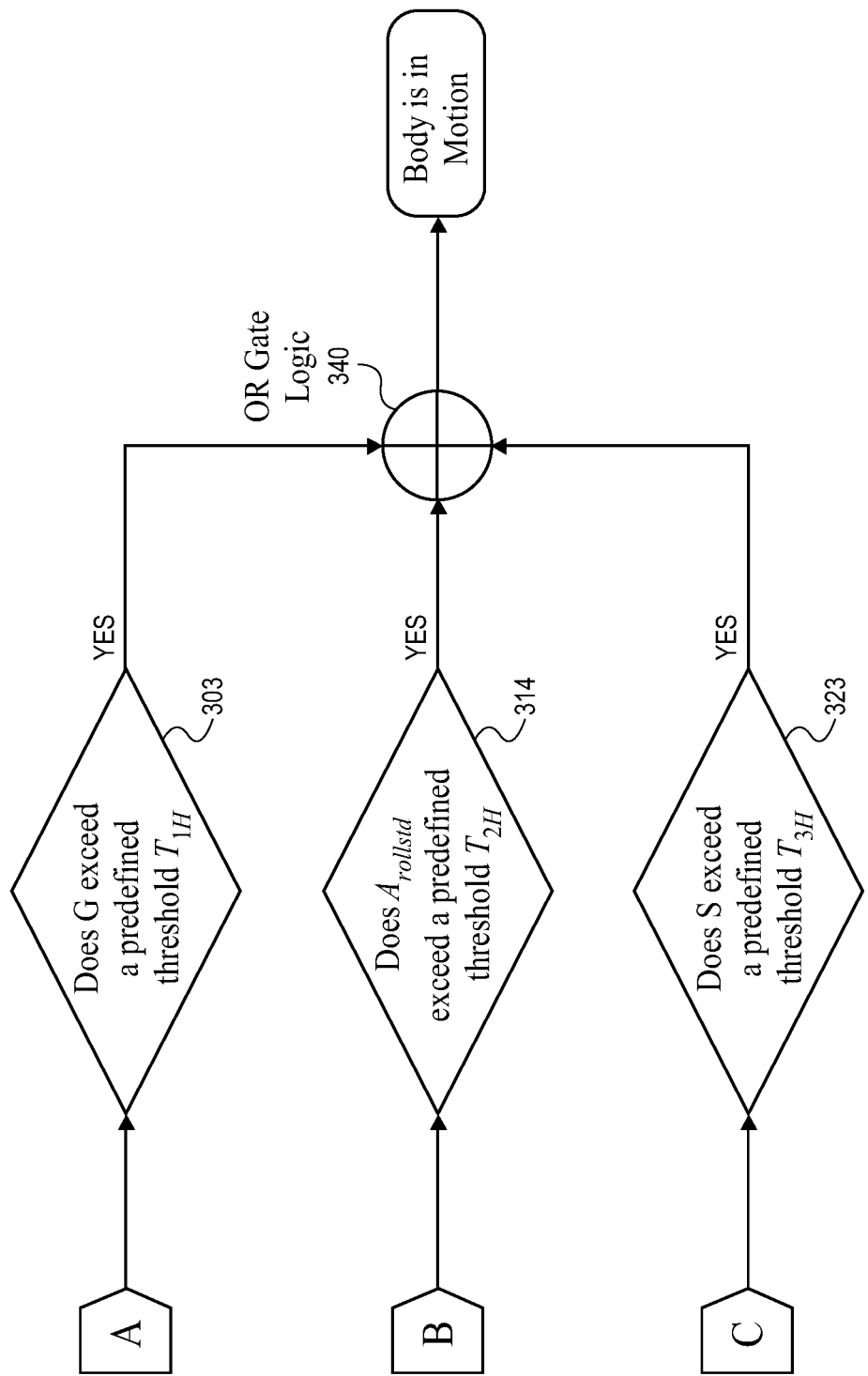

FIGS. 3A and 3B illustrates some embodiments of an auto detection algorithm to determine whether the antenna (and the vehicle, maritime vessel, or other movable object to which the antenna is coupled) is in motion (e.g., moving or stationary). The process is performed by processing logic that comprises hardware (e.g., circuitry, dedicated logic, etc.), software (e.g., software running on a chip(s) or processor(s), etc.), firmware, or a combination of the three. In one embodiment, the processing logic is part of an antenna for satellite communication such as, for example, an antenna that is part of a satellite network terminal.

In some embodiments, the algorithm makes a determination of whether an antenna is in motion every antenna pattern refresh frame, which indicates the motion state of the vehicle (i.e., whether the vehicle is moving or not). Motion need not be just translational but could also be rotational or vibrational. Depending on the motion state of the vehicle (i.e., whether in motion or at rest), a suitable control algorithm could be applied to control the antenna. In some embodiments, such a control algorithm calculates the commanded polarization angle for the antenna in different ways depending on the motion state of the antenna (as opposed to applying the same algorithm at both rest and motion, which yields suboptimal results).

In some embodiments, the only available sensors for the terminal are an accelerometer and a gyroscope (each of which provides measurements for the x, y and z components) and a GPS that provides only the translational speed (referred to as the GPS speed) in km/hour in a fixed direction (the direction of heading of the vehicle). In some embodiments, GPS measurements are subject to acquisition of a GPS satellite and the GPS speed is reported only at certain intervals. Therefore, the GPS is used in conjunction with the accelerometer and gyroscope readings to make a deterministic inference regarding motion. In some embodiments, the intervals are 1 second intervals (which is much slower than the gyroscope or accelerometer readings).

In some embodiments, the accelerometer and a gyroscope readings from the sensor and the GPS data can be obtained and processed. Thereafter, using empirical thresholds, a determination is made based on the processed data as to whether to classify the antenna to be in motion or at rest.

Referring to FIGS. 3A and 3B, operations performed by the algorithm include:
 (1) receiving readings from the accelerometer (311) and gyroscope (301) every frame (e.g., every 4 msecs, every 1 msecs, etc.) but the speed from the GPS is received every predetermined period of time (e.g., every 1 second, every ⅛ second, etc.).
 (2) receiving gyroscope reports readings (301) with in degrees per second for each of the three axes (x, y and z). In some embodiments, these readings can be either positive or negative. In some embodiments, for every frame, the satellite terminal takes the absolute value of the readings for each of the 3 axes and then computes the maximum of these three absolute values (302). This metric is referred to herein as G.

(3) receiving reading (311) from an accelerometer (e.g., in terms of multiples of 1 g, where 1 g equals 1 unit=9.8 m/s$^2$) for each of the x, y and z components. In some embodiments, the satellite terminal takes the norm of these three components. In some embodiments, the norm (312) that is calculated every frame is referred to herein as A. The process calculates a rolling standard deviation, $A_{rollstd}$, (of a pre configured length) of the values of A (313) is used as a predictor of motion. In some embodiments, the duration of the average is 200 msec; though other durations could be used. By using a rolling average, the bias of the gyroscope is removed and no threshold is needed for the standard deviation.

(4) receiving a GPS report of the speed (321). In one embodiment, the GPS reports the speed in km/hour of the vehicle every 1 second (as opposed to every 4 msecs as reported by the accelerometer and the gyroscope). However, the terminal makes a decision every frame regarding the state of the vehicle. The last GPS speed received is used as an estimate for the current frame (322). In other words, the speed from the GPS report for the current frame is used if available, and if not available, the most-recently received GPS speed is used.

(5) Each of these three calculated metrics—G (302), $A_{rollstd}$ (313) and estimated GPS speed (322) are then compared against their respective thresholds using comparators 303, 314, and 323, respectively. The results of the comparisons are evaluated using logical ORing functionality, such that if any one of these metrics exceeds their respective threshold, the satellite terminal concludes that the vehicle is in motion.

(6) By adjusting the three threshold values, it is possible to increase or decrease the sensitivity of the algorithm.

Note that in alternative embodiments, other sensors on the terminal besides, for example, the accelerometer, may be used by the terminal to determine the motion profile for the antenna and select the mode of operation for the antenna based on that motion profile.

Figure 4:
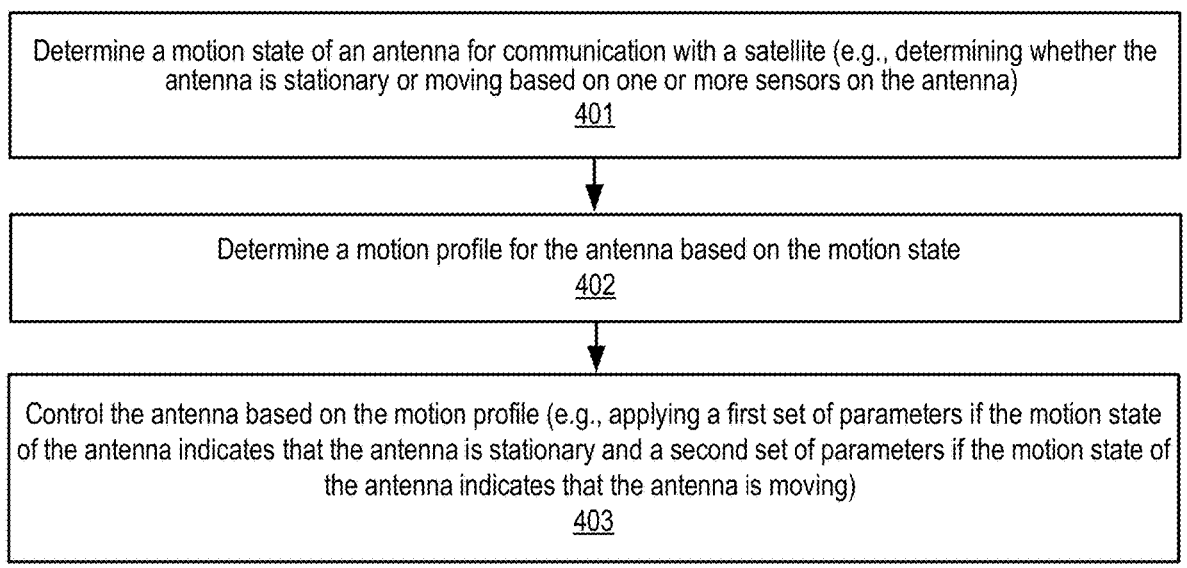
FIG. 4 is a flow diagram of some embodiments of a process for controlling an antenna.

FIG. 4 is a flow diagram of some embodiments of a process for controlling an antenna. The process is performed by processing logic that comprises hardware (e.g., circuitry, dedicated logic, etc.), software (e.g., software running on a chip(s) or processor(s), etc.), firmware, or a combination of the three. In one embodiment, the processing logic is part of an antenna for satellite communication such as, for example, an antenna that is part of a satellite network terminal. In some embodiments, the antenna comprises a metasurface antenna having metamaterial radio frequency (RF) radiating antenna elements.

Referring to FIG. 4, the process begins by processing logic determining a motion state of an antenna that is used for communication with a satellite (processing block 401). In some embodiments, determining the motion state of the antenna comprises determining whether the antenna is stationary or moving based on one or more sensors in the antenna. In some embodiments, the one or more sensors, including a gyroscope, an accelerometer, and a global positioning system (GPS) sensor determine whether the antenna is stationary or moving is based on data from the gyroscope, the accelerator, and the GPS sensor, or data that is derived from the information from these sensors.

In response to determining the motion state, processing logic determines the motion profile for the antenna (processing block 402) and controls the antenna based on the motion profile (processing block 403). In some embodiments, controlling the antenna based on the motion profile comprises applying a first set of parameters if the motion state of the antenna indicates that the antenna is stationary or applying a second set of parameters if the motion state of the antenna indicates that the antenna is moving.

In some embodiments, the first and second sets of parameters include parameters affecting cross-polarization performance. In such a case, applying the first set of parameters used when the antenna is stationary improves cross-polarization performance over the cross-polarization performance that results from applying the second set of parameters used when the antenna is moving. In some embodiments, the first set of parameters causes the antenna to perform cross-polarization using tilt indications from one or more accelerometers to determine the orientation of the antenna and the second set of parameters causes the antenna to perform cross-polarization without using the tilt indications from one or more accelerometers to determine the orientation. In some embodiments, the second set of parameters cause the antenna to perform cross-polarization using data from one or more sensors other than accelerometers to determine the orientation of the antenna. In some embodiments, the first set of parameters causes the antenna to perform bias estimation of the gyroscope and/or measure a gravity vector of one or more accelerometers when the antenna is determined to be stationary, while the second set of parameters does not cause the antenna to perform these operations when the antenna is determined to be moving.

In some embodiments, the first set of parameters causes the antenna to perform a first pointing and tracking algorithm when the motion state indicates that the antenna is stationary and the second set of parameters causes the antenna to perform a second pointing and tracking algorithm, which is different from the first pointing and tracking algorithm, when the motion state indicates that the antenna is moving. For example, in some embodiments, the pointing and tracking algorithm specified by the second set of parameters causes the antenna to use a more expanded search base when the antenna is moving and searching for a satellite signal then the first pointing and tracking algorithm used for when the antenna is stationary.

FIG. 5A is a flow diagram of one embodiment of a process for determining whether the antenna is stationary or moving. The process is performed by processing logic that comprises hardware (e.g., circuitry, dedicated logic, etc.), software (e.g., software running on a chip(s) or processor(s), etc.), firmware, or a combination of the three. In some embodiments, the processing logic is part of an antenna for satellite communication such as, for example, an antenna that is part of a satellite network terminal. In some embodiments, the antenna comprises a metasurface antenna having metamaterial radio frequency (RF) radiating antenna elements.

Referring to FIG. 5A, the process begins by processing logic obtaining first and second readings from the gyroscope and accelerator, respectively, and a GPS report of a speed from the GPS sensor (processing block 501). This data may be received from sensors on the antenna itself.

In response to obtaining the first and second readings and the GPS speed report, processing logic derives first, second and third values from the first and second readings in the GPS speed, respectively (processing block 502). In some embodiments, driving the first, second and third values from the first and second readings in the speed comprises at least one of the following: setting the first value to a maximum value from a set of absolute values of gyroscope components of the first reading from the gyroscope, setting the second value to a norm of the x, y and z accelerometer components of the second readings and calculating a rolling average over a predetermined period of time, such as, for example, 200 msec, of a standard deviation of the second reading from the accelerometer; and setting the third value to the speed of a current frame (e.g., refresh rate of the antenna pattern) or the last-reported GPS speed if no GPS report exists for the current frame.

After generating the first, second and third values, processing logic compares those values with first, second and third thresholds, respectively (processing block 503), and determines that the antenna is in motion based on results of the comparisons. In some embodiments, the antenna is determined to be in motion if any one of the first, second and third values is greater than its corresponding first, second and third thresholds, respectively.

FIG. 5B is a flow diagram of one embodiment of a process for deriving values from sensor data received from sensor data. The process is performed by processing logic that comprises hardware (e.g., circuitry, dedicated logic, etc.), software (e.g., software running on a chip(s) or processor(s), etc.), firmware, or a combination of the three. In some embodiments, the processing logic is part of an antenna for satellite communication such as, for example, an antenna that is part of a satellite network terminal. In some embodiments, the antenna comprises a metasurface antenna having metamaterial radio frequency (RF) radiating antenna elements.

Referring to FIG. 5B, the process begins by processing logic setting a first value to a maximum value from a set of absolute values of the gyroscope components from a reading from a gyroscope (processing block 511). Processing logic also sets a second value to a norm of the x, y and z accelerometer components of a reading from an accelerometer and calculates a rolling average of a predetermined period of time of a standard deviation of the reading from the accelerometer (processing block 512). Processing logic also sets a third value to the speed from the GPS report for current frame or a last-reported GPS speed if no GPS speed report exists for the current frame (processing block 513).

Examples of Antenna Embodiments

The techniques described above may be used with flat panel satellite antennas. Embodiments of such flat panel antennas are disclosed. The flat panel antennas include one or more arrays of antenna elements on an antenna aperture. In some embodiments, the antenna aperture is a metasurface antenna aperture, such as, for example, the antenna apertures described below. In some embodiments, the antenna elements comprise diodes and varactors such as, for example, described above and described in U.S. Patent Application Publication No. 20210050671, entitled "Metasurface Antennas Manufactured with Mass Transfer Technologies," published Feb. 18, 2021. In other embodiments, the antenna elements comprises LC-based antenna elements, such as, for example, those disclosed in U.S. Pat. No. 9,887,456, entitled "Dynamic polarization and coupling control from a steerable cylindrically fed holographic antenna", issued Feb. 6, 2018, or other RF radiating antenna elements. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Figure 6:
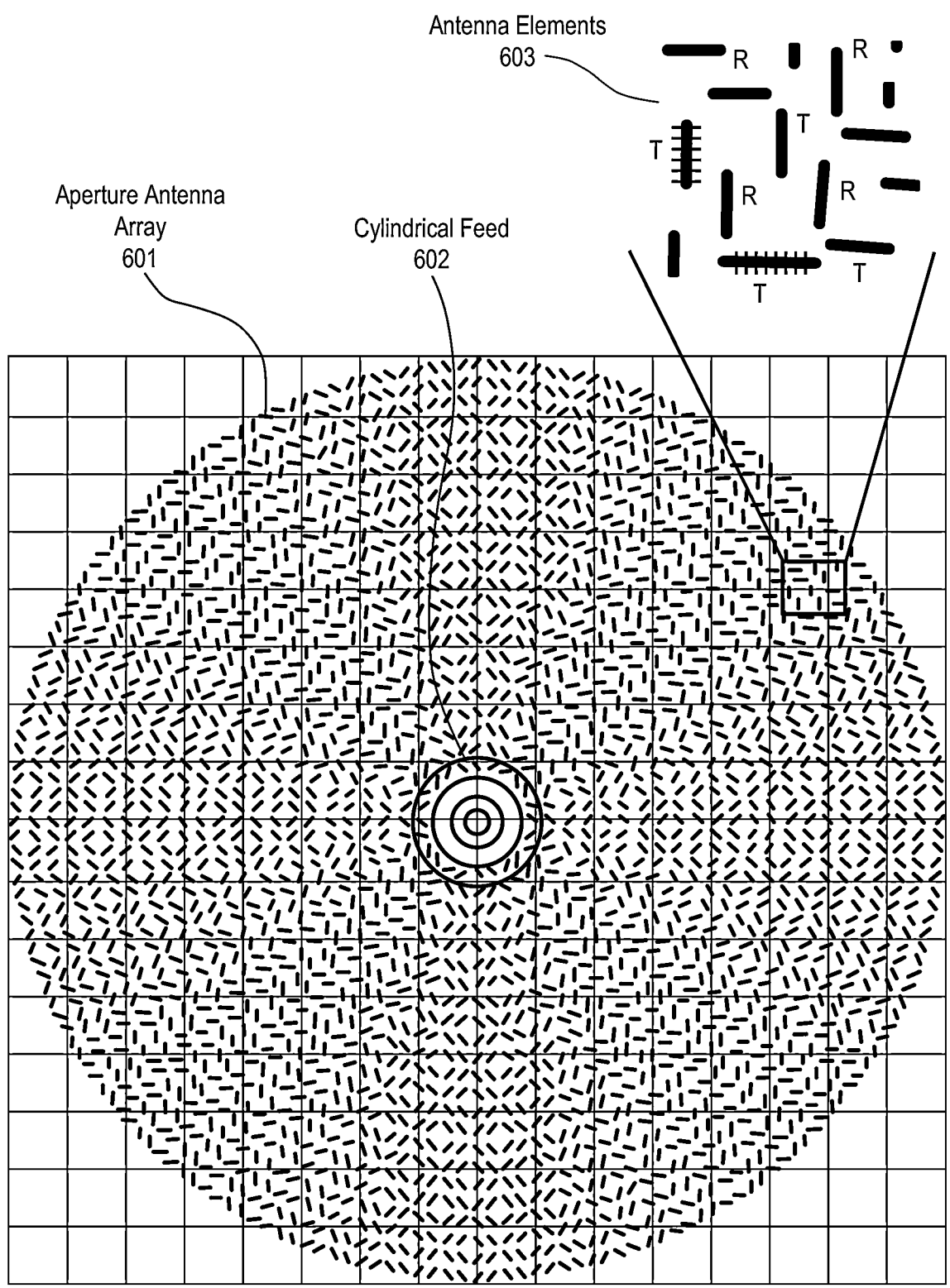
FIG. 6 illustrates the schematic of one embodiment of a cylindrically fed holographic radial aperture antenna.

FIG. 6 illustrates the schematic of one embodiment of a cylindrically fed holographic radial aperture antenna. Referring to FIG. 6, the antenna aperture has one or more arrays 601 of antenna elements 603 that are placed in concentric rings around an input feed 602 of the cylindrically fed antenna. In one embodiment, antenna elements 603 are radio frequency (RF) resonators that radiate RF energy. In one embodiment, antenna elements 603 comprise both Rx and Tx irises that are interleaved and distributed on the whole surface of the antenna aperture. Such Rx and Tx irises, or slots, may be in groups of three or more sets where each set is for a separately and simultaneously controlled band. Examples of such antenna elements with irises are described in greater detail below. Note that the RF resonators described herein may be used in antennas that do not include a cylindrical feed.

In one embodiment, the antenna includes a coaxial feed that is used to provide a cylindrical wave feed via input feed 602. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 603 comprise irises (iris openings) and the aperture antenna of FIG. 6 is used to generate a main beam shaped by using excitation from a cylindrical feed wave for radiating the iris openings through tunable diodes and/or varactors. In one embodiment, the antenna can be excited to radiate a horizontally or vertically polarized electric field at desired scan angles.

In one embodiment, each scattering element in the antenna system is part of a unit cell as described above. In one embodiment, the unit cell is driven by the direct drive embodiments described above. In one embodiment, the diode/varactor in each unit cell has a lower conductor associated with an iris slot from an upper conductor associated with its tuning electrode (e.g., iris metal). The diode/varactor can be controlled to adjust the bias voltage between the iris opening and the patch electrode. Using this property, in one embodiment, the diode/varactor integrates an on/off switch for the transmission of energy from the guided wave to the unit cell. When switched on, the unit emits an electromagnetic wave like an electrically small dipole antenna. Note that the teachings herein are not limited to having unit cell that operates in a binary fashion with respect to energy transmission.

In one embodiment, the feed geometry of this antenna system allows the antenna elements to be positioned at forty-five-degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch electrode using a controller. Traces to each patch electrode are used to provide the voltage to the patch electrode. The voltage is used to tune or detune the capacitance and thus the resonance frequency of individual elements to effectuate beam forming. The voltage required is dependent on the diode/varactor being used.

In one embodiment, as discussed above, a matrix drive is used to apply voltage to the patch electrodes in order to drive each cell separately from all the other cells without having a separate connection for each cell (direct drive). Because of the high density of elements, the matrix drive is an efficient way to address each cell individually.

In one embodiment, the control structure for the antenna system has two main components: the antenna array controller, which includes drive electronics for the antenna system, is below the wave scattering structure of surface scattering antenna elements such as described herein, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space, and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 7:
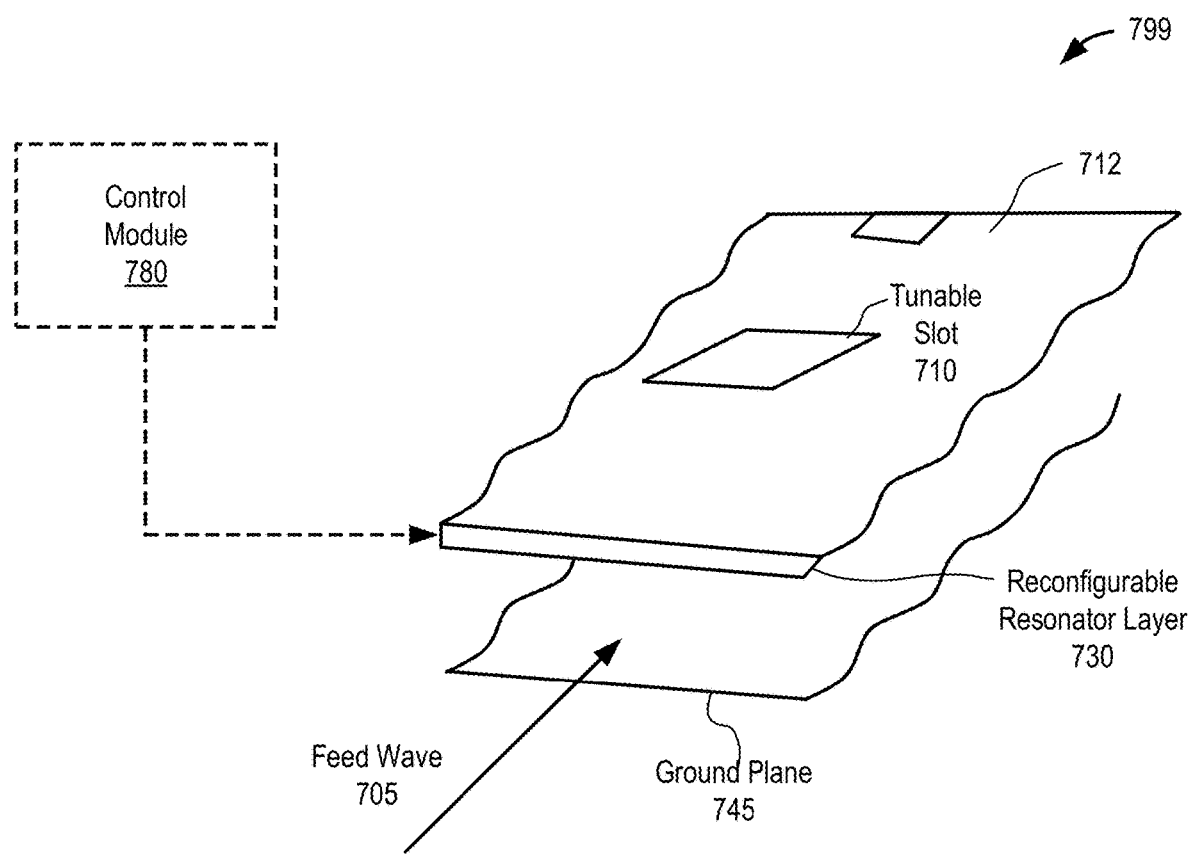
FIG. 7 illustrates a perspective view of one row of antenna elements that includes a ground plane and a reconfigurable resonator layer.

FIG. 7 illustrates a perspective view of one row of antenna elements that includes a ground plane 745 and a reconfigurable resonator layer 730. Reconfigurable resonator layer 730 includes an array 712 of tunable slots 710. The array 712 of tunable slots 710 can be configured to point the antenna in a desired direction. Each of the tunable slots 710 can be tuned/adjusted by varying a voltage, which changes the capacitance of the varactor diode and results in a frequency shift, which in turn changes the amplitude and phase of the radiating antenna element. A proper phase and amplitude adjustment of the antenna elements in an array will result in a beam formation and beam steering.

Control module 780, or a controller, is coupled to reconfigurable resonator layer 730 to modulate the array 712 of tunable slots 710 by varying the voltage to the diodes/varactors. Control module 780 may include a Field Programmable Gate Array ("FPGA"), a microprocessor, a controller, System-on-a-Chip (SoC), or other processing logic. In one embodiment, control module 780 includes logic circuitry (e.g., multiplexer) to drive the array 712 of tunable slots 710. In one embodiment, control module 780 receives data that includes specifications for a holographic diffraction pattern to be driven onto the array 712 of tunable slots 710. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 780 may drive each array of tunable slots described in various embodiments in the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 705 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 710 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w_{in}*w_{out}$, with $w_{in}$ as the wave equation in the waveguide and $w_{out}$ the wave equation on the outgoing wave.

A voltage between the patch electrode and the iris opening can be modulated to tune the antenna element (e.g., the tunable resonator/slot). Adjusting the voltage varies the capacitance of a slot (e.g., the tunable resonator/slot). Accordingly, the reactance of a slot (e.g., the tunable resonator/slot) can be varied by changing the capacitance. Resonant frequency of the slot also changes according to the equation $$f = \frac{1}{2\pi\sqrt{LC}}$$

where f is the resonant frequency of the slot and L and C are the inductance and capacitance of the slot, respectively. The resonant frequency of the slot affects the energy radiated from feed wave 705 propagating through the waveguide. As an example, if feed wave 705 is 20 GHz, the resonant frequency of a slot 710 may be adjusted (by varying the capacitance) to 17 GHz so that the slot 710 couples substantially no energy from feed wave 705. Or, the resonant frequency of a slot 710 may be adjusted to 20 GHz so that the slot 710 couples energy from feed wave 705 and radiates that energy into free space. Although the examples given are binary (fully radiating or not radiating at all), full gray scale control of the reactance, and therefore the resonant frequency of slot 710 is possible with voltage variance over a multi-valued range. Hence, the energy radiated from each slot 710 can be finely controlled so that detailed holographic diffraction patterns can be formed by the array of tunable slots.

In one embodiment, tunable slots in a row are spaced from each other by $\lambda/5$. Other spacings may be used. In one embodiment, each tunable slot in a row is spaced from the closest tunable slot in an adjacent row by $\lambda/2$, and, thus, commonly oriented tunable slots in different rows are spaced by $\lambda/4$, though other spacings are possible (e.g., $\lambda/5$, $\lambda/6.3$). In another embodiment, each tunable slot in a row is spaced from the closest tunable slot in an adjacent row by $\lambda/3$.

Figure 8A:
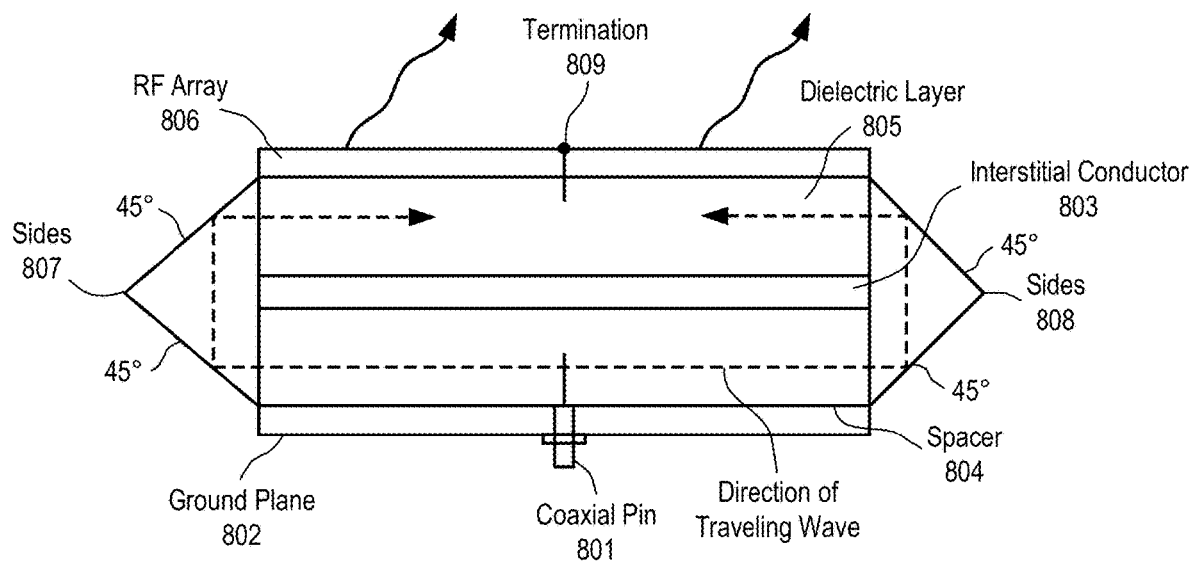
FIG. 8A illustrates a side view of one embodiment of a cylindrically fed antenna structure.

FIG. 8A illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 8A includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 8A, a coaxial pin 801 is used to excite the field on the lower level of the antenna. In one embodiment, coaxial pin 801 is a 50Ω coax pin that is readily available. Coaxial pin 801 is coupled (e.g., bolted) to the bottom of the antenna structure, which is conducting ground plane 802.

Separate from conducting ground plane 802 is interstitial conductor 803, which is an internal conductor. In one embodiment, conducting ground plane 802 and interstitial conductor 803 are parallel to each other. In one embodiment, the distance between ground plane 802 and interstitial conductor 803 is 0.1-0.15". In another embodiment, this distance may be $\lambda/2$, where $\lambda$ is the wavelength of the travelling wave at the frequency of operation.

Ground plane 802 is separated from interstitial conductor 803 via a spacer 804. In one embodiment, spacer 804 is a foam or air-like spacer. In one embodiment, spacer 804 comprises a plastic spacer.

On top of interstitial conductor 803 is dielectric layer 805. In one embodiment, dielectric layer 805 is plastic. The purpose of dielectric layer 805 is to slow the travelling wave relative to free space velocity. In one embodiment, dielectric layer 805 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric layer 805, such as periodic sub-wavelength metallic structures that can be machined or lithographically defined, for example.

An RF array 806 is on top of dielectric layer 805. In one embodiment, the distance between interstitial conductor 803 and RF array 806 is 0.1-0.15". In another embodiment, this distance may be $\lambda_{eff}/2$, where $\lambda_{eff}$ is the effective wavelength in the medium at the design frequency.

The antenna includes sides 807 and 808. Sides 807 and 808 are angled to cause a travelling wave feed from coax pin 801 to be propagated from the area below interstitial conductor 803 (the spacer layer) to the area above interstitial conductor 803 (the dielectric layer) via reflection. In one embodiment, the angle of sides 807 and 808 are at 45° angles. In an alternative embodiment, sides 807 and 808 could be replaced with a continuous radius to achieve the reflection. While FIG. 8A shows angled sides that have angle of 45 degrees, other angles that accomplish signal transmission from lower-level feed to upper-level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 801, the wave travels outward concentrically oriented from coaxial pin 801 in the area between ground plane 802 and interstitial conductor 803. The concentrically outgoing waves are reflected by sides 807 and 808 and travel inwardly in the area between interstitial conductor 803 and RF array 806. The reflection from the edge of the circular perimeter causes the wave to remain in phase (i.e., it is an in-phase reflection). The travelling wave is slowed by dielectric layer 805. At this point, the travelling wave starts interacting and exciting with elements in RF array 806 to obtain the desired scattering.

To terminate the travelling wave, a termination 809 is included in the antenna at the geometric center of the antenna. In one embodiment, termination 809 comprises a pin termination (e.g., a 50Ω pin). In another embodiment, termination 809 comprises an RF absorber that terminates unused energy to prevent reflections of that unused energy back through the feed structure of the antenna. These could be used at the top of RF array 806.

Figure 8B:
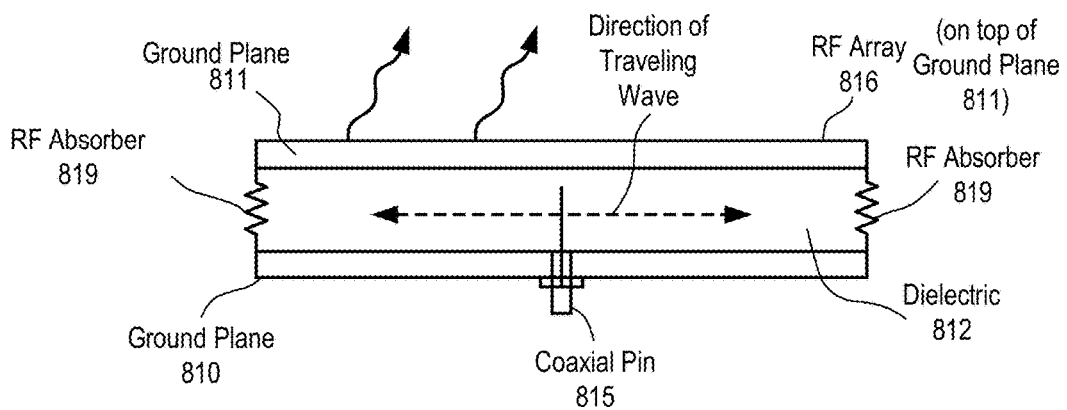
FIG. 8B illustrates another embodiment of the antenna system with an outgoing wave.

FIG. 8B illustrates another embodiment of the antenna system with an outgoing wave. Referring to FIG. 8B, two ground planes 810 and 811 are substantially parallel to each other with a dielectric layer 812 (e.g., a plastic layer, etc.) in between ground planes 810, 811. RF absorbers 819 (e.g., resistors) couple the two ground planes 810 and 811 together. A coaxial pin 815 (e.g., 50Ω) feeds the antenna. An RF array 816 is on top of dielectric layer 812 and ground plane 811.

In operation, a feed wave is fed through coaxial pin 815 and travels concentrically outward and interacts with the elements of RF array 816.

The cylindrical feed in both the antennas of FIGS. 8A and 8B improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 806 of FIG. 8A and RF array 816 of FIG. 8B include a wave scattering subsystem that includes a group of patch antennas (e.g., scatterers) that act as radiators. This group of patch antennas comprises an array of scattering metamaterial elements.

In one embodiment, the cylindrical feed geometry of this antenna system allows the unit cells elements to be positioned at forty-five-degree (45°) angles to the vector of the wave in the wave feed. This position of the elements enables control of the polarization of the free space wave generated from or received by the elements. In one embodiment, the unit cells are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

Cell Placement

Figure 9:
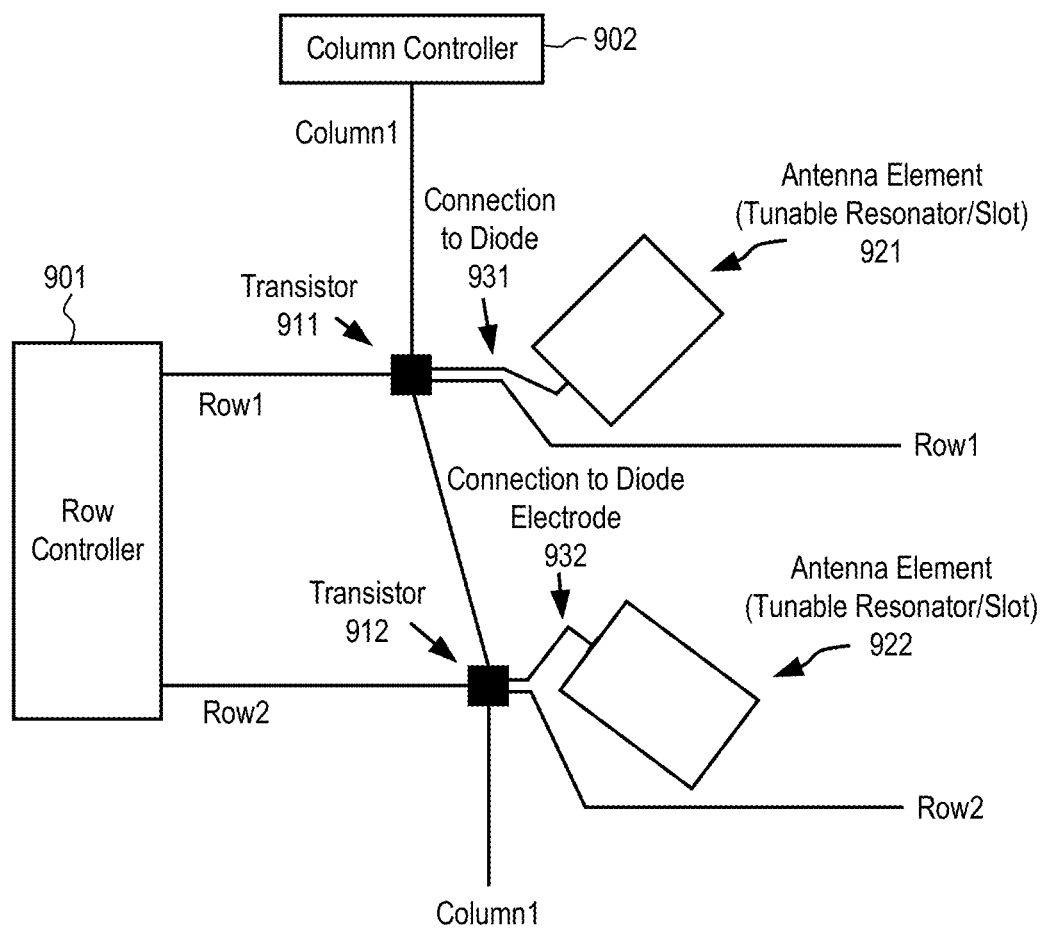
FIG. 9 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 9 illustrates one embodiment of the placement of matrix drive circuitry with respect to antenna elements. Referring to FIG. 9, row controller 901 is coupled to transistors 911 and 912, via row select signals Row1 and Row2, respectively, and column controller 902 is coupled to transistors 911 and 912 via column select signal Column1. Transistor 911 is also coupled to antenna element 921 via connection to diode 931, while transistor 912 is coupled to antenna element 922 via connection to diode 932.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 10:
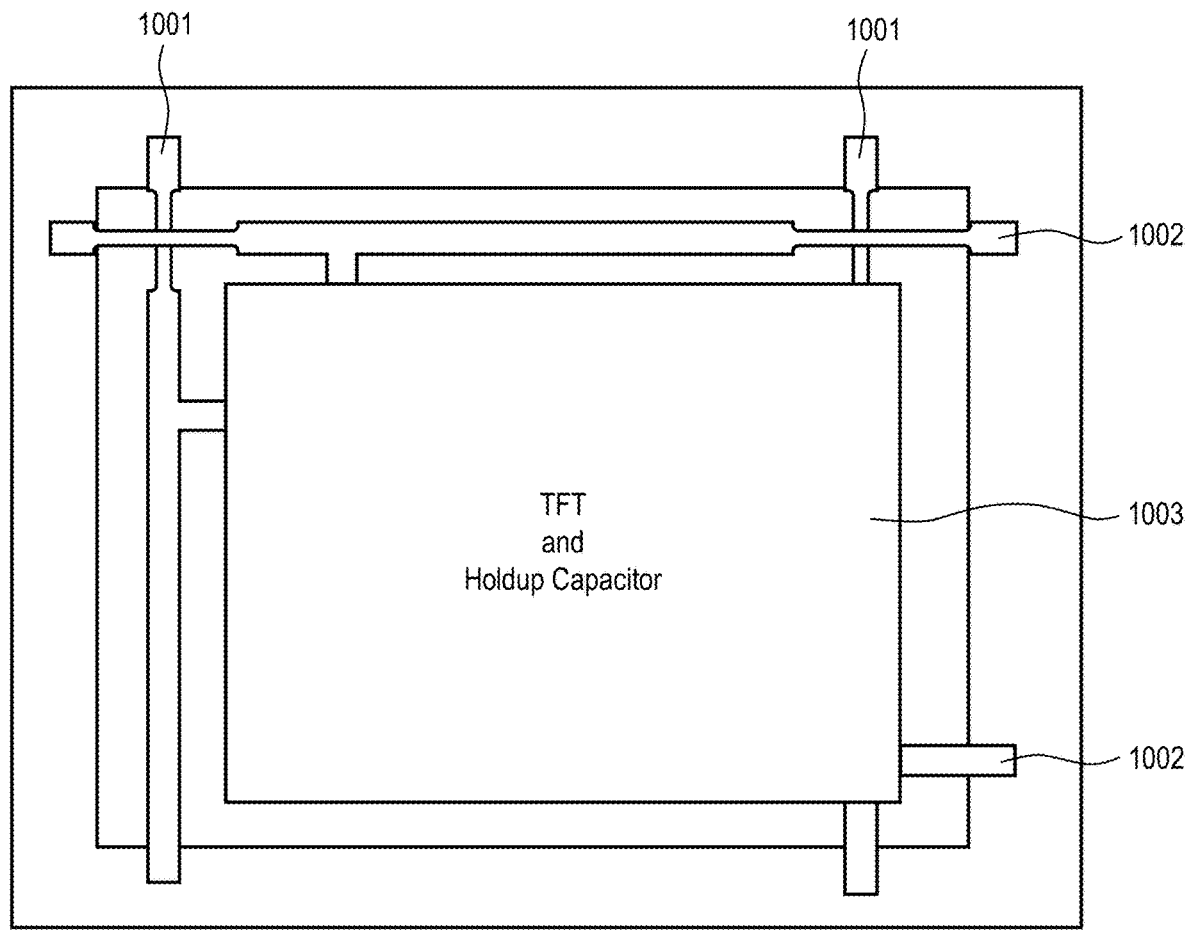
FIG. 10 illustrates one embodiment of a TFT package.

In one embodiment, a TFT package is used to enable placement and unique addressing in the matrix drive. FIG. 10 illustrates one embodiment of a TFT package. Referring to FIG. 10, a TFT and a hold capacitor 1003 is shown with input and output ports. There are two input ports connected to traces 1001 and two output ports connected to traces 1002 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 11:
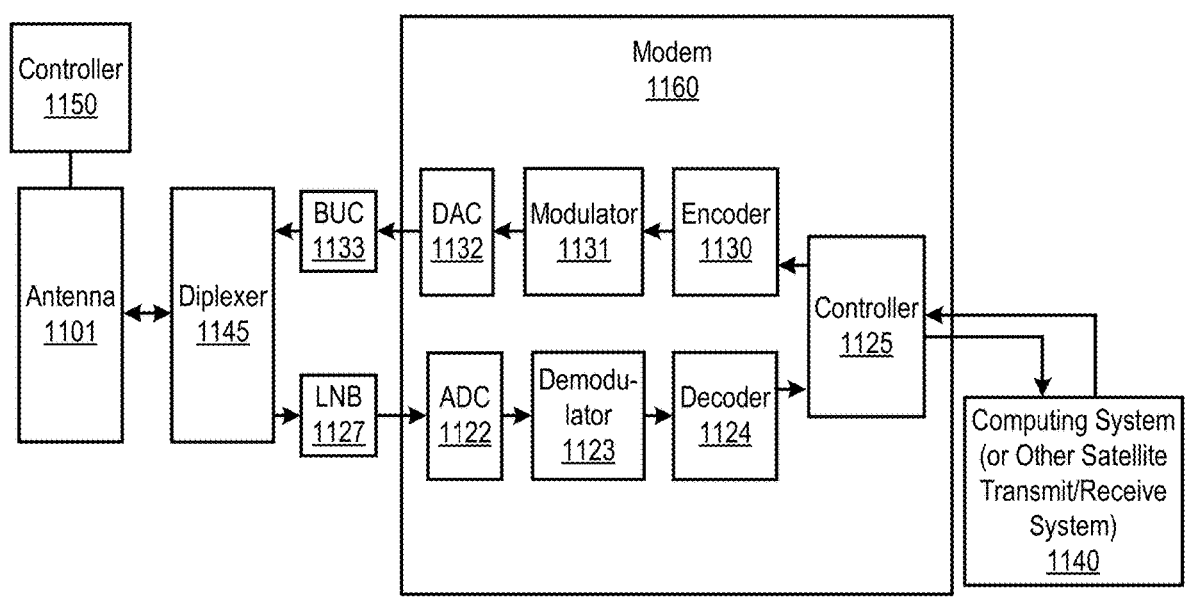
FIG. 11 is a block diagram of one embodiment of a communication system having simultaneous transmit and receive paths.

In another embodiment, the combined antenna apertures are used in a full duplex communication system. FIG. 11 is a block diagram of an embodiment of a communication system having simultaneous transmit and receive paths. While only one transmit path and one receive path are shown, the communication system may include more than one transmit path and/or more than one receive path.

Referring to FIG. 11, antenna 1101 includes two spatially interleaved antenna arrays operable independently to transmit and receive simultaneously at different frequencies as described above. In one embodiment, antenna 1101 is coupled to diplexer 1145. The coupling may be by one or more feeding networks. In one embodiment, in the case of a radial feed antenna, diplexer 1145 combines the two signals and the connection between antenna 1101 and diplexer 1145 is a single broad-band feeding network that can carry both frequencies.

Diplexer 1145 is coupled to a low noise block down converter (LNB) 1127, which performs a noise filtering function and a down conversion and amplification function in a manner well-known in the art. In one embodiment, LNB 1127 is in an out-door unit (ODU). In another embodiment, LNB 1127 is integrated into the antenna apparatus. LNB 1127 is coupled to a modem 1160, which is coupled to computing system 1140 (e.g., a computer system, modem, etc.).

Modem 1160 includes an analog-to-digital converter (ADC) 1122, which is coupled to LNB 1127, to convert the received signal output from diplexer 1145 into digital format. Once converted to digital format, the signal is demodulated by demodulator 1123 and decoded by decoder 1124 to obtain the encoded data on the received wave. The decoded data is then sent to controller 1125, which sends it to computing system 1140.

Modem 1160 also includes an encoder 1130 that encodes data to be transmitted from computing system 1140. The encoded data is modulated by modulator 1131 and then converted to analog by digital-to-analog converter (DAC) 1132. The analog signal is then filtered by a BUC (up-convert and high pass amplifier) 1133 and provided to one port of diplexer 1145. In one embodiment, BUC 1133 is in an out-door unit (ODU).

Diplexer 1145 operating in a manner well-known in the art provides the transmit signal to antenna 1101 for transmission.

Controller 1150 controls antenna 1101, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 11 has a number of applications, including but not limited to, internet communication, vehicle communication (including software updating), etc.

With reference to FIGS. 1-11, it should be appreciated that other tunable capacitors, tunable capacitance dies, packaged dies, micro-electromechanical systems (MEMS) devices, or other tunable capacitance devices, could be placed into an aperture or elsewhere in variations on the embodiments described herein, for further embodiments. The techniques for mass transfer may be applicable to further embodiments, including placement of various dies, packaged dies or MEMS devices on various substrates for electronically scanned arrays and various further electrical, electronic and electromechanical devices.

There is a number of example embodiments described herein.

Example 1 is a method comprising: determining a motion state of an antenna for communication with a satellite; determining a motion profile for the antenna based on the motion state; and controlling the antenna based on the motion profile.

Example 2 is the method of example 1 that may optionally include that determining the motion state of the antenna comprises determining whether the antenna is stationary or moving based on one or more sensors on the antenna.

Example 3 is the method of example 2 that may optionally include that the one or more sensors comprises a gyroscope, an accelerometer, and a global position system (GPS) sensor, and wherein determining whether the antenna is stationary or moving is based on data from the gyroscope, the accelerometer, and the GPS sensor, or data derived therefrom.

Example 4 is the method of example 3 that may optionally include that determining whether the antenna is stationary or moving comprises: obtaining first and second readings from the gyroscope and the accelerometer, respectively, and a GPS report of a speed from the GPS sensor; deriving first, second and third values from the first and second readings and the speed; comparing the first, second and third values to first, second and third thresholds, respectively; and determining that the antenna is in motion based on results of comparing the first, second and third values to first, second and third thresholds, respectively.

Example 5 is the method of example 4 that may optionally include that deriving first, second and third values from the first and second readings and the speed comprises at least one of: setting the first value to a maximum value from a set of absolute values of gyroscope components of the first reading; setting the second value to a norm of x, y and z accelerometer components of the second reading and calculating a rolling average of a predetermined period of time of a standard deviation of the second reading; and setting the third value to the speed for a current frame or a last-reported GPS speed if no GPS report exists for the current frame.

Example 6 is the method of example 5 that may optionally include that determining that the antenna is in motion comprises determining any one of the first, second and third values is greater than its corresponding first, second and third thresholds, respectively.

Example 7 is the method of example 1 that may optionally include that controlling the antenna comprises applying a first set of parameters if the motion state of the antenna indicates that the antenna is stationary and a second set of parameters if the motion state of the antenna indicates that the antenna is moving.

Example 8 is the method of example 7 that may optionally include that the first and second sets of parameters includes parameters affecting cross polarization performance, and wherein applying the first set of parameters improves cross polarization performance over cross polarization) performance resulting from application of the second set of parameters.

Example 9 is the method of example 7 that may optionally include that the first set of parameters cause the antenna to determine orientation of the antenna using tilt indications from one or more accelerometers and the second set of parameters cause the antenna to determine orientation of the antenna without using the tilt indications from the one or more accelerometers.

Example 10 is the method of example 9 that may optionally include that the second set of parameters cause the antenna to determine antenna orientation using sensor data other than accelerometers data to determine the orientation of the antenna.

Example 11 is the method of example 8 that may optionally include that the first set of parameters cause the antenna to perform bias estimation of the gyroscope and measure a gravity vector of the one or more accelerometers and the second set of parameters do not cause the antenna to perform gyroscope bias estimation and measure a gravity vector of the one or more accelerometers.

Example 12 is the method of example 8 that may optionally include that the first set of parameters cause the antenna to perform a first pointing and tracking algorithm and the second set of parameters cause the antenna to perform a second pointing and tracking algorithm, the first and second pointing and tracking algorithms being different.

Example 13 is the method of example 12 that may optionally include that the second pointing and tracking algorithm uses a more expanded search space when the antenna is moving and searching for a satellite signal than the first pointing and tracking algorithm used when the antenna is stationary.

Example 14 is a satellite network terminal antenna comprising: an antenna aperture having a plurality of antenna elements; a plurality of sensors; an antenna controller coupled to the plurality of sensors and the antenna aperture, the antenna controller having one or more processors operable to: determine whether the antenna is stationary or moving based on the plurality of sensors on the antenna; determine a motion profile for the antenna based on the motion state; and control the antenna based on the motion profile.

Example 15 is the satellite network terminal antenna of example 14 that may optionally include that the one or more sensors comprises a gyroscope, an accelerometer, and a global position system (GPS) sensor, and wherein the one or more processors determine whether the antenna is stationary or moving based on data from the gyroscope, the accelerometer, and the GPS sensor, or data derived therefrom.

Example 16 is the satellite network terminal antenna of example 15 that may optionally include that the one or more processors determine whether the antenna is stationary or moving by: obtaining first and second readings from the gyroscope and the accelerometer, respectively, and a GPS report of a speed from the GPS sensor; deriving first, second and third values from the first and second readings and the speed; comparing the first, second and third values to first, second and third thresholds, respectively; and determining that the antenna is in motion if results of comparing the first, second and third values to first, second and third thresholds, respectively, indicates any one of the first, second and third values is greater than its corresponding first, second and third thresholds, respectively.

Example 17 is the satellite network terminal antenna of example 16 that may optionally include that deriving first, second and third values from the first and second readings and the speed comprises at least one of: setting the first value to a maximum value from a set of absolute values of gyroscope components of the first reading; setting the second value to a norm of x, y and z accelerometer components of the second reading and calculating a rolling average of a predetermined period of time of a standard deviation of the second reading; and setting the third value to the speed for a current frame or a last-reported GPS speed if no GPS report exists for the current frame.

Example 18 is the satellite network terminal antenna of example 14 that may optionally include that the one or more processors control the antenna by applying a first set of parameters if the motion state of the antenna indicates that the antenna is stationary and a second set of parameters if the motion state of the antenna indicates that the antenna is moving.

Example 19 is the satellite network terminal antenna of example 18 that may optionally include that the first set of parameters cause the antenna to determine orientation of the antenna using tilt indications from one or more accelerometers and the second set of parameters cause the antenna to determine orientation of the antenna without using the tilt indications from the one or more accelerometers.

Example 20 is the satellite network terminal antenna of example 18 that may optionally include that the first set of parameters cause the antenna to perform bias estimation of the gyroscope and measure a gravity vector of the one or more accelerometers and the second set of parameters do not cause the antenna to perform gyroscope bias estimation and measure a gravity vector of the one or more accelerometers.

Example 21 is the satellite network terminal antenna of example 18 that may optionally include that the first set of parameters cause the antenna to perform a first pointing and tracking algorithm and the second set of parameters cause the antenna to perform a second pointing and tracking algorithm, the first and second pointing and tracking algorithms being different, and further wherein the second pointing and tracking algorithm uses a more expanded search space when the antenna is moving and searching for a satellite signal than the first pointing and tracking algorithm used when the antenna is stationary.

Example 22 is one or more non-transitory computer readable storage media having instructions stored thereupon which, when executed by a flat-panel satellite network terminal antenna having at least a processor and a memory therein, cause the system to perform operations comprising: determining a motion state of an antenna for communication with a satellite, wherein determining the motion state of the antenna comprises determining whether the antenna is stationary or moving based on one or more sensors on the antenna; determining a motion profile for the antenna based on the motion state; and controlling the antenna based on the motion profile.

Example 23 is the one or more non-transitory computer readable storage media of example 22 that may optionally include that the one or more sensors comprises a gyroscope, an accelerometer, and a global position system (GPS) sensor, and wherein determining whether the antenna is stationary or moving is based on data from the gyroscope, the accelerometer, and the GPS sensor, or data derived therefrom, and further wherein determining whether the antenna is stationary or moving comprises: obtaining first and second readings from the gyroscope and the accelerometer, respectively, and a GPS report of a speed from the GPS sensor;

deriving first, second and third values from the first and second readings and the speed; comparing the first, second and third values to first, second and third thresholds, respectively; and determining that the antenna is in motion based on results of comparing the first, second and third values to first, second and third thresholds, respectively.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description.

All changes which come within the meaning and range of equivalency of the claims are to be embraced within their scope.

We claim:

1. A method comprising:
   determining a motion state of an antenna for communication with a satellite;
   determining a motion profile for the antenna based on the motion state; and
   controlling the antenna based on the motion profile, wherein controlling the antenna comprises
      determining whether the motion state of the antenna indicates that the antenna is stationary,
      applying a first set of parameters upon determining that the motion state of the antenna indicates that the antenna is stationary,
      determining whether the motion state of the antenna indicates that the antenna is moving, and
      applying a second set of parameters upon determining that the motion state of the antenna indicates that the antenna is moving, wherein the first set of parameters cause the antenna to determine orientation of the antenna using tilt indications from one or more accelerometers and the second set of parameters cause the antenna to determine orientation of the antenna without using the tilt indications from the one or more accelerometers.

2. The method of claim 1 wherein determining the motion state of the antenna comprises determining whether the antenna is stationary or moving based on one or more sensors on the antenna.

3. The method of claim 2 wherein the one or more sensors comprises a gyroscope, an accelerometer, and a global position system (GPS) sensor, and wherein determining whether the antenna is stationary or moving is based on data from the gyroscope, the accelerometer, and the GPS sensor, or data derived therefrom.

4. The method of claim 3 wherein determining whether the antenna is stationary or moving comprises:
   obtaining, by a satellite user terminal, first and second readings from the gyroscope and the accelerometer, respectively, and a GPS report of a speed from the GPS sensor;
   deriving, by the satellite user terminal, first, second and third values from the first and second readings and the speed;
   comparing, by the satellite user terminal, the first, second and third values to first, second and third thresholds, respectively; and
   determining that the antenna is in motion based on results of comparing the first, second and third values to first, second and third thresholds, respectively.

5. The method of claim 4 wherein deriving first, second and third values from the first and second readings and the speed comprises at least two of:
   setting the first value to a maximum value from a set of absolute values of gyroscope components of the first reading;
   setting the second value to a norm of x, y and z accelerometer components of the second reading and calculating a rolling average of a predetermined period of time of a standard deviation of the second reading; and
   setting the third value to the speed for a current frame or a last-reported GPS speed if no GPS report exists for the current frame.

6. The method of claim 5 wherein determining that the antenna is in motion comprises determining any one of the first, second and third values is greater than its corresponding first, second and third thresholds, respectively.

7. The method of claim 1 wherein the first and second sets of parameters includes parameters affecting cross polarization performance, and wherein applying the first set of parameters improves cross polarization performance over cross polarization performance resulting from application of the second set of parameters.

8. The method of claim 1 wherein the second set of parameters cause the antenna to determine antenna orientation using sensor data other than accelerometers data to determine the orientation of the antenna.

9. The method of claim 1 wherein the first set of parameters cause the antenna to perform bias estimation of the gyroscope and measure a gravity vector of the one or more accelerometers and the second set of parameters do not cause the antenna to perform gyroscope bias estimation and measure a gravity vector of the one or more accelerometers.

10. The method of claim 1 wherein the first set of parameters cause the antenna to perform a first pointing and tracking algorithm and the second set of parameters cause the antenna to perform a second pointing and tracking algorithm, the first and second pointing and tracking algorithms being different.

11. The method of claim 10 wherein the second pointing and tracking algorithm uses a more expanded search space when the antenna is moving and searching for a satellite signal than the first pointing and tracking algorithm used when the antenna is stationary.

12. A satellite network terminal antenna comprising:
    an antenna aperture having a plurality of antenna elements;
    a plurality of sensors;
    an antenna controller coupled to the plurality of sensors and the antenna aperture, the antenna controller having one or more processors operable to:
    determine whether the antenna is stationary or moving based on the plurality sensors on the antenna;
    determine a motion profile for the antenna based on a motion state; and
    control the antenna based on the motion profile, wherein the one or more processors control the antenna by
       determining whether the motion state of the antenna indicates that the antenna is stationary,
       applying a first set of parameters upon determining that the motion state of the antenna indicates that the antenna is stationary,
    determining whether the motion state of the antenna indicates that the antenna is moving, and
       applying a second set of parameters upon determining that the motion state of the antenna indicates that the antenna is moving,
       wherein the first set of parameters cause the antenna to determine orientation of the antenna using tilt indications from one or more accelerometers and the second set of parameters cause the antenna to determine orientation of the antenna without using the tilt indications from the one or more accelerometers.

13. The satellite network terminal antenna of claim 12 wherein the one or more sensors comprises a gyroscope, an accelerometer, and a global position system (GPS) sensor, and wherein the one or more processors determine whether the antenna is stationary or moving based on data from the gyroscope, the accelerometer, and the GPS sensor, or data derived therefrom.

14. The satellite network terminal antenna of claim 13 wherein the one or more processors determine whether the antenna is stationary or moving by:
- obtaining first and second readings from the gyroscope and the accelerometer, respectively, and a GPS report of a speed from the GPS sensor;
- deriving first, second and third values from the first and second readings and the speed;
- comparing the first, second and third values to first, second and third thresholds, respectively; and
- determining that the antenna is in motion if results of comparing the first, second and third values to first, second and third thresholds, respectively, indicates any one of the first, second and third values is greater than its corresponding first, second and third thresholds, respectively.

15. The satellite network terminal antenna of claim 14 wherein deriving first, second and third values from the first and second readings and the speed comprises two or more of:
- setting the first value to a maximum value from a set of absolute values of gyroscope components of the first reading;
- setting the second value to a norm of x, y and z accelerometer components of the second reading and calculating a rolling average of a predetermined period of time of a standard deviation of the second reading; and
- setting the third value to the speed for a current frame or a last-reported GPS speed if no GPS report exists for the current frame.

16. The satellite network terminal antenna of claim 12 wherein the first set of parameters cause the antenna to perform bias estimation of the gyroscope and measure a gravity vector of the one or more accelerometers and the second set of parameters do not cause the antenna to perform gyroscope bias estimation and measure a gravity vector of the one or more accelerometers.

17. The satellite network terminal antenna of claim 12 wherein the first set of parameters cause the antenna to perform a first pointing and tracking algorithm and the second set of parameters cause the antenna to perform a second pointing and tracking algorithm, the first and second pointing and tracking algorithms being different, and further wherein the second pointing and tracking algorithm uses a more expanded search space when the antenna is moving and searching for a satellite signal than the first pointing and tracking algorithm used when the antenna is stationary.

18. One or more non-transitory computer readable storage media having instructions stored thereupon which, when executed by a satellite network terminal antenna having at least a processor and a memory therein, cause the system to perform operations comprising:
- determining a motion state of an antenna for communication with a satellite, wherein determining the motion state of the antenna comprises determining whether the antenna is stationary or moving based on one or more sensors on the antenna;
- determining a motion profile for the antenna based on the motion state; and
- controlling the antenna based on the motion profile, wherein controlling the antenna comprises
  - determining whether the motion state of the antenna indicates that the antenna is stationary,
  - applying a first set of parameters upon determining that the motion state of the antenna indicates that the antenna is stationary,
  - determining whether the motion state of the antenna indicates that the antenna is moving, and
  - applying a second set of parameters upon determining that the motion state of the antenna indicates that the antenna is moving, wherein the first set of parameters cause the antenna to determine orientation of the antenna using tilt indications from one or more accelerometers and the second set of parameters cause the antenna to determine orientation of the antenna without using the tilt indications from the one or more accelerometers.

19. The one or more non-transitory computer readable storage media of claim 18 wherein the one or more sensors comprises a gyroscope, an accelerometer, and a global position system (GPS) sensor, and wherein determining whether the antenna is stationary or moving is based on data from the gyroscope, the accelerometer, and the GPS sensor, or data derived therefrom, and further wherein determining whether the antenna is stationary or moving comprises:
- obtaining first and second readings from the gyroscope and the accelerometer, respectively, and a GPS report of a speed from the GPS sensor;
- deriving first, second and third values from the first and second readings and the speed;
- comparing the first, second and third values to first, second and third thresholds, respectively; and
- determining that the antenna is in motion based on results of comparing the first, second and third values to first, second and third thresholds, respectively.

* * * * *